US009374197B2

(12) United States Patent
Teplitsky et al.

(10) Patent No.: US 9,374,197 B2
(45) Date of Patent: Jun. 21, 2016

(54) METHODS AND ARRANGEMENTS FOR DIRECT CURRENT ESTIMATION OF A WIRELESS COMMUNICATION PACKET

(71) Applicant: Intel Corporation, Santa Clara, CA (US)

(72) Inventors: Moshe Teplitsky, Tel-Aviv (IL); Michael Genossar, Modiin (IL); Elan Banin, Raanana (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/229,803

(22) Filed: Mar. 28, 2014

(65) Prior Publication Data

US 2015/0280862 A1     Oct. 1, 2015

(51) Int. Cl.
*H04L 1/00* (2006.01)
*H04B 1/30* (2006.01)

(52) U.S. Cl.
CPC .............. *H04L 1/0045* (2013.01); *H04B 1/30* (2013.01); *H04B 2001/305* (2013.01); *Y02B 60/50* (2013.01)

(58) Field of Classification Search
USPC .................................. 375/319, 344, 345, 350
See application file for complete search history.

(56) References Cited

U.S. PATENT DOCUMENTS

2004/0032919 A1   2/2004  Loan et al.
2004/0264432 A1  12/2004  Hori et al.
2005/0258989 A1*  11/2005  Li et al. ........................ 341/120
2007/0190957 A1   8/2007  Filipovic
2009/0258626 A1* 10/2009  Yamada et al. ............. 455/253.2
2009/0285334 A1  11/2009  Birkett et al.
2010/0309958 A1  12/2010  Lakkis
2010/0310009 A1* 12/2010  Lakkis .......................... 375/308
2010/0316175 A1  12/2010  Zeng et al.
2011/0122852 A1   5/2011  Yu et al.

FOREIGN PATENT DOCUMENTS

KR       100270310 B1    10/2000
WO       2014074174 A1    5/2014

OTHER PUBLICATIONS

Wireless Gigabit Alliance (WGA) Specifications, WiGig MAC and PHY Specification Version 1.0, Apr. 2010—Final Specification, 311 pages.

(Continued)

*Primary Examiner* — Kabir A Timory
(74) *Attorney, Agent, or Firm* — Schubert Law Group PLLC

(57) ABSTRACT

Logic for direct current (DC) estimation of a wireless communication packet. Logic may determine a first DC estimation based upon a first set of sequences in a preamble of the wireless communication packet. Logic may determine a second DC estimation based upon a second set of sequences in the preamble. Logic may select one of the DC estimations based upon a frequency-offset estimation. Logic may remove one of the DC estimations from the packet. Logic to null DC bins that result from a Fourier transform of the packet to mitigate transmitter DC bias. And logic to determine a correction for the packet based upon a difference between a predetermined guard interval value and a received guard interval value and to apply the correction to the packet.

25 Claims, 7 Drawing Sheets

(56) References Cited

OTHER PUBLICATIONS

IEEE Std 802.11TM—2012, (Revision of IEEE Std 802.11—2007), IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, Mar. 29, 2012, 2793 pages, IEEE, New York, NY, USA.

International Search Report and Written Opinion received for PCT Application No. PCT/US2013/047210, mailed on October 15, 2013, 14 pages.

International Preliminary Report on Patentability (Chapter I of the Patent Cooperation Treaty) received for PCT Application No. PCT/US2013/047210, mailed on May 21, 2015, 8 pages.

* cited by examiner

METHODS AND ARRANGEMENTS FOR DIRECT CURRENT ESTIMATION OF A WIRELESS COMMUNICATION PACKET

TECHNICAL FIELD

Embodiments are in the field of wireless communications. More particularly, embodiments may involve estimation of Direct Current (DC) bias in wireless communication signals and mitigation or correction of the signal for DC bias.

BACKGROUND

A wireless local area network (WLAN) may facilitate wireless communications between wireless communication devices. A received wireless communication signal may suffer DC impairment. DC impairment can cause errors in receipt of data packets of the signal and reduce data throughput on the wireless communications channel. When communicating, for example, at relatively high Signal-to-Noise-Ratio (SNR) levels, mitigation of a DC component of a received signal at a relatively high accuracy level may be required for acceptable data throughput. The DC impairment may vary based on various parameters, e.g., gain, temperature, and the like.

One method of mitigating the DC component may include using a notch filter. For example, a High Pass Filter (HPF) may be utilized. However, the HPF may also affect other spectral components of the signal, e.g., by reducing a gain of certain spectral components. For example, applying the HPF to a Short Training Field (STF) of a preamble of a wireless communication packet may result in degradation of a Channel Estimation (CE) field of the preamble.

DETAILED DESCRIPTION OF EMBODIMENTS

Figure 1:
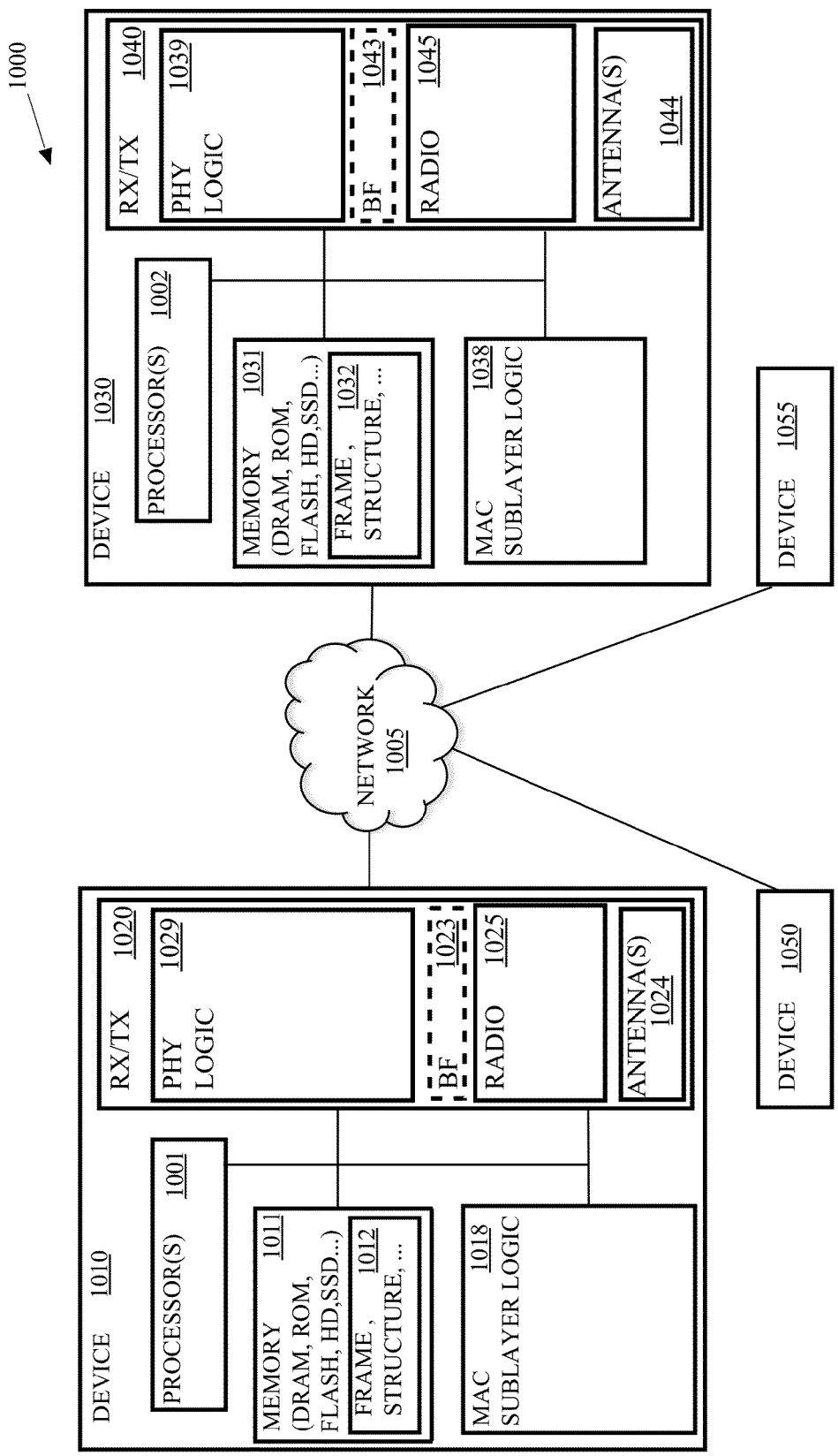
FIG. 1 depicts an embodiment of a wireless network comprising a plurality of communications devices with physical layer (PHY) logic to estimate DC bias and mitigate DC bias in packets of a wireless communication signal.

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

References to "one embodiment," "an embodiment," "example embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Embodiments may include an energy detection device that recognizes a wireless communication signal and may enable a receiver to receive the wireless communication signal. In many embodiments, an antenna or antenna array may receive the signal and pass the signal to a radio for processing. The radio may, for instance, remove quadrature and phase imbalances, convert the signal to a digital signal, and pass the signal to time domain logic for processing.

In many embodiments, the received signal may include a DC bias from the transmitter and a DC bias from the receiver. Due to frequency offset (FO), the receiver may perceive the Transmitter (Tx) DC and Receiver (Rx) DC as separate tones. In such cases, the Rx DC may be a complex constant $dc_{Rx}$ and the Tx DC may be a time variant spur $dc_{Tx}e^{jwk}$.

Embodiments may address the two separate tones by associating the packet with one of, e.g., two different scenarios: a high FO or a low FO. In the high FO scenario, the Tx DC changes quickly in time domain and, in frequency domain, the two spurs are far from each other and it is relatively easy to distinguish between the two impairments.

In the low FO scenario, the Tx DC changes slowly in the time domain and, in frequency domain, the two spurs are close to each other. It is very hard to distinguish between the two impairments but over short time intervals their sum can be approximated as DC.

Other techniques for mitigating the DC impairment in the signal may include a notch filter, a regular mean estimator, and an online DC estimator without transmitter DC estimation. Notch filters may include, e.g., a high pass filter (HPF) to mitigate receiver and transmitter (Rx/Tx) DC but the HPF will damage the signal. In particular, the HPF will damage both the CE (Channel estimation) field and the data. The power of the signal error depends on the bandwidth of the filter and the signal statistical properties. The quality of the Rx/Tx DC mitigation will depend on the frequency offset between them and the bandwidth of the filter.

The regular mean estimator may involve simple mean estimation that will suffer from a noise-floor that is proportional to the transmitter (Tx) DC power. Therefore, for nominal Tx DC power, such as −23 decibels relative to the carrier (dBc), simple mean estimation will lead to poor DC estimation quality.

Online DC estimation without Tx DC estimation may estimate receiver (Rx) DC under the assumption that there is no Tx DC by periodic DC estimation from the preamble. When Tx DC is present, the performance of this solution may be degraded.

Embodiments may offer an improvement over the other techniques by enabling Rx DC estimation and mitigation in the presence of Tx DC with insubstantial or no damage to the signal. Many embodiments use a combination of two different processes, one per FO scenario. For the high FO scenario, many embodiments implement PHY logic to use the longest section of a short training sequence (STS) in the short training field (STF) of a preamble of the packet that has identical repetitive signal structure [Ga, Ga, . . . , Ga]. And for the low FO scenario, many embodiments implement the PHY logic to use the section of Golay sequences in the STF that has an average zero mean: [Ga, −Ga].

In several embodiments, the PHY logic may determine both a high FO DC estimation of a receiver DC bias and a low FO DC estimation of the receiver DC bias. In many embodiments, the PHY logic may select one of the DC estimations based upon a FO estimation (FOE) by Acquisition (ACQ) logic and the PHY logic may remove the selected one of the DC estimations from the packet. In several embodiments, the selection between the high FO Rx DC estimation and the low FO Rx DC estimation is based upon a comparison of the FOE against a threshold FO such as 5 parts per million (ppm).

In further embodiments, after removing or subtracting the Rx DC estimate from the packet and correcting for the frequency offset, nulling logic may null the DC bins resulting from a Fourier transform of the packet to mitigate Tx DC bias. Thereafter, and post equalization, some embodiments may estimate a correction for any residual Tx and Rx DC bias with a guard interval (GI) based determination and apply the correction to the packet.

Some embodiments are implemented in a WiGig (IEEE 802.11ad) Signal Carrier PHY mode that is designed to operate at moderate-high SNR regime and requires accurate DC estimation procedures. The WiGig (IEEE 802.1 lad) Signal Carrier PHY mode may include Golay sequences of Ga and −Ga at the sync position.

Various embodiments may be designed to address different technical problems associated with Rx DC estimation and mitigation in the presence of Tx DC. Other technical problems may include mitigating Tx DC bias, estimating residual Tx and Rx DC bias, mitigating residual Tx and Rx DC bias, and/or the like with insubstantial or no damage to the packet.

Different technical problems such as those discussed above may be addressed by one or more different embodiments. For instance, some embodiments that address Rx DC estimation and mitigation in the presence of Tx DC may do so by one or more different technical means such as determining a first DC estimation of a receiver based upon a first set of sequences in a preamble of a wireless communication packet, determining a second DC estimation of the receiver based upon a second set of sequences in the preamble, selecting one of the DC estimations based upon a frequency offset estimation, and removing the one of the DC estimations from the packet, and/or the like.

Some embodiments implement WirelessHD Specification Version 1.1D1, May 2010. Several embodiments may implement Ecma International, Standard ECMA-387, High Rate 60 GHz PHY, MAC and PALS, 2nd Ed., December 2010. Further embodiments may implement Wireless Gigabit Alliance, WiGig 1.1 specification, June 2011. Some embodiments implement Institute of Electrical and Electronic Engineers (IEEE) 802.11 systems such as IEEE 802.11ad systems and other systems that operate in accordance with standards such as the IEEE 802.11-2012, IEEE Standard for Information technology—Telecommunications and information exchange between systems—Local and metropolitan area networks—Specific requirements—Part 11: Wireless LAN Medium Access Control (MAC) and Physical Layer (PHY) Specifications (http://standards.ieee.org/getieee802/download/802.11-2012.pdf).

Some embodiments implement Institute of Electrical and Electronic Engineers (IEEE) 802.15 systems such as IEEE 802.15.3 systems and other systems that operate in accordance with standards such as the IEEE 802.15, IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs), IEEE Computer Society, The Institute of Electrical and Electronics Engineers, Inc., 3 Park Avenue, New York, N.Y., 29 Sep. 2003.

Some embodiments are particularly directed to improvements for wireless local area network (WLAN), such as a WLAN implementing one or more Institute of Electrical and Electronics Engineers (IEEE) 802.11 standards (sometimes collectively referred to as "Wi-Fi", or wireless fidelity).

Some embodiments, implement the Bluetooth® specification (e.g. BLUETOOTH SPECIFICATION Version 4.0, Bluetooth SIG, Inc., Publication date: 30 Jun. 2010). The embodiments, however, are not limited to these standards.

Several embodiments comprise Personal Basic Service Set (PBSS) Central Point, or PCP for and/or client devices of PCPs or stations (STAs) such as docking stations, routers, switches, servers, workstations, netbooks, mobile devices (Ultrabook™, Laptop, Smart Phone, Tablet, and the like).

Logic, modules, devices, and interfaces herein described may perform functions that may be implemented in hardware and/or code. Hardware and/or code may comprise software, firmware, microcode, processors, state machines, chipsets, or combinations thereof designed to accomplish the functionality.

Embodiments may facilitate wireless communications. Some embodiments may comprise low power wireless communications like Bluetooth®, wireless local area networks (WLANs), wireless metropolitan area networks (WMANs), wireless personal area networks (WPAN), cellular networks, communications in networks, messaging systems, and smart-devices to facilitate interaction between such devices. Furthermore, some wireless embodiments may incorporate a single antenna while other embodiments may employ multiple antennas. The one or more antennas may couple with a processor and a radio to transmit and/or receive radio waves. For instance, multiple-input and multiple-output (MIMO) is the use of radio channels carrying signals via multiple antennas at both the transmitter and receiver to improve communication performance.

This disclosure is not limited to WLAN related standards, but may also apply to wireless wide area networks (WWANs) and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The examples are not limited in this context.

While some of the specific embodiments described below will reference the embodiments with specific configurations, those of skill in the art will realize that embodiments of the present disclosure may advantageously be implemented with other configurations with similar issues or problems.

Turning now to FIG. 1, there is shown an embodiment of a wireless communication system 1000. The wireless communication system 1000 comprises a communications device 1010 that may be wire line and wirelessly connected to a network 1005. The communications device 1010 may communicate wirelessly with a plurality of communication devices 1030, 1050, and 1055 via the network 1005. The communications device 1010 may comprise a docking station that functions as an access point (AP) and/or a Personal Basic Service Set (PBSS) Control Point (PCP). The communications device 1030 may comprise a low power communications device such as a consumer electronics device, a personal mobile device, an Ultrabook™, or the like, in the network 1005 of the communications device 1010. The communications device 1050 may comprise a low power communications device such as a consumer electronics device, a personal mobile device, an Ultrabook™, or the like. And communications device 1055 may comprise printers, laptops, netbooks, cellular phones, smart phones, PDAs, or other wireless-capable devices that also operate as stations. Thus, communications devices may be communicatively coupled via the network 1005 and be mobile or fixed.

The communications device 1010 may utilize antenna(s) 1024 to communicate within one or more stations, such as communication devices 1030, 1050, and 1055, and may transmit a wireless communication packet to the communications device 1030. The communications device 1030 may enable the radio 1045 to receive the packet and begin to receive the packet. In many embodiments, the communications device 1010 may transmit a packet with a preamble and a payload. The communications device 1030 may receive the preamble first and the first part of the preamble may include a short training field. The short training field (STF) may comprise multiple short training sequences (STSs) such as Golay sequences.

The communications device 1030 may comprise a radio 1045 coupled with PHY logic 1039. The communications device 1010 may comprise a radio 1025 coupled with similar PHY logic 1029 and the communications devices 1050 and 1055 may also comprise radios with PHY logic such as the PHY logic 1039 coupled with the radio 1045 of the communications device 1030.

The PHY logic 1039 may receive the Golay sequences and begin processing the sequences to determine a stable gain for the signal. After determining a stable gain for the signal, the PHY logic 1039 may include logic to determine means of Golay sequences, or blocks, and storing the means in a high frequency offset (FO), first in first out (FIFO) queue in memory 1031. Memory 1031, in several embodiments, may comprise one or more buffers that are physically located in or are coupled with the PHY logic 1039 and/or radio 1045. Note that, in many embodiments, the goal of the high FO DC estimation is to determine a mean over a large number of Golay sequences so high FO DC estimation does not have to wait until a boundary of a Golay sequence is identified but can start determining a mean at a sample from within a Golay sequence.

After ACQ logic detects the boundaries of the Golay sequences, the PHY logic 1039 may begin to determine the mean of Golay sequences between the Golay sequence boundaries to determine a low FO Rx DC estimation and store the means in a low FO FIFO queue in memory 1031. In many embodiments, the PHY logic 1039 may be performing the means estimations for the Golay sequences for the high FO Rx DC estimation and the low FO Rx DC estimation concurrently. Then, when the ACQ logic determines a sync position, which may be the Golay sequence pair identified as (Ga, −Ga), the PHY logic 1039 may receive an FOE from the ACQ logic and may correct the packet for the FO. After receiving the sync position, the PHY logic 1039 may also end the estimations of the means of the Golay sequences and calculate the high FO Rx DC estimation and the low FO Rx DC estimation based upon the means estimations in the high FO and low FO FIFO queues in memory 1031.

After receiving the FOE, the PHY logic 1039 may compare the FOE with a predetermined, threshold FO stored in the memory 1031 or otherwise accessible by the PHY logic 1039. In many embodiments, FOEs greater than the threshold FO may cause the PHY logic 1039 to select the high FO DC estimation for use in removing the Rx DC from the packet and FOEs less than the threshold FO may cause the PHY logic 1039 to select the low FO DC estimation for use in removing the Rx DC from the packet. Embodiments may vary as to whether a FOE equal to the threshold FOE causes the PHY logic 1039 to select the high FO DC estimation or the low FO DC estimation for use in removing the Rx DC from the packet based upon design preferences.

In further embodiments, the selection of the high FO DC estimation or the low FO DC estimation may occur prior to the calculation of the high FO DC estimation or the low FO DC estimation. In such embodiments, the PHY logic 1039 may only calculate the high FO DC estimation or the low FO DC estimation from the means estimations in the FIFO queues.

In several embodiments, the PHY logic 1039 may also null DC bins for the packet that result from a Fourier transform of the packet to mitigate Tx DC. In further embodiments, the PHY logic 1039 may determine a correction for the packet based upon a difference between a predetermined guard interval (GI) value and a received GI value and may apply the correction to the packet after equalization to estimate and mitigate any residual Tx DC and Rx DC in the packet.

FIGS. 2A-E, there is shown an embodiment 2000 of the PHY logic illustrated in FIG. 1 as well as embodiments of a timeline, simulation, and timing offset error related thereto. Referring to the FIG. 2A, the embodiment 2000 comprises an analog-to-digital converter (ADC) 2010, and the PHY logic 2015. The ADC 2010 may convert analog signals of a received wireless communication packet into digital samples to be processed by the PHY logic 2015.

The PHY logic 2015 may perform DC estimation for an input signal 2012 received as input from the ADC 2010 based upon input from the ACQ logic 2040 and output a DC and FO corrected signal 2050 to frequency domain logic 2060 for further processing. The PHY logic 2015 may comprise time domain logic 2020, ACQ logic 2040, frequency domain logic 2060, and post equalization (EQ) logic 2070.

The time domain logic 2020 may sample the input signal 2012 to determine a high FO Rx DC estimation and a low FO Rx DC estimation, select the appropriate estimation based upon a frequency offset estimation (FOE), and subtract the appropriate DC estimation from the digital signal received as input from the ADC 2010. The time domain logic 2020 may comprise a high FO logic 2022, a low FO logic 2024, a high/low select logic 2026, and Rx DC estimation logic 2028.

Figure 2A:
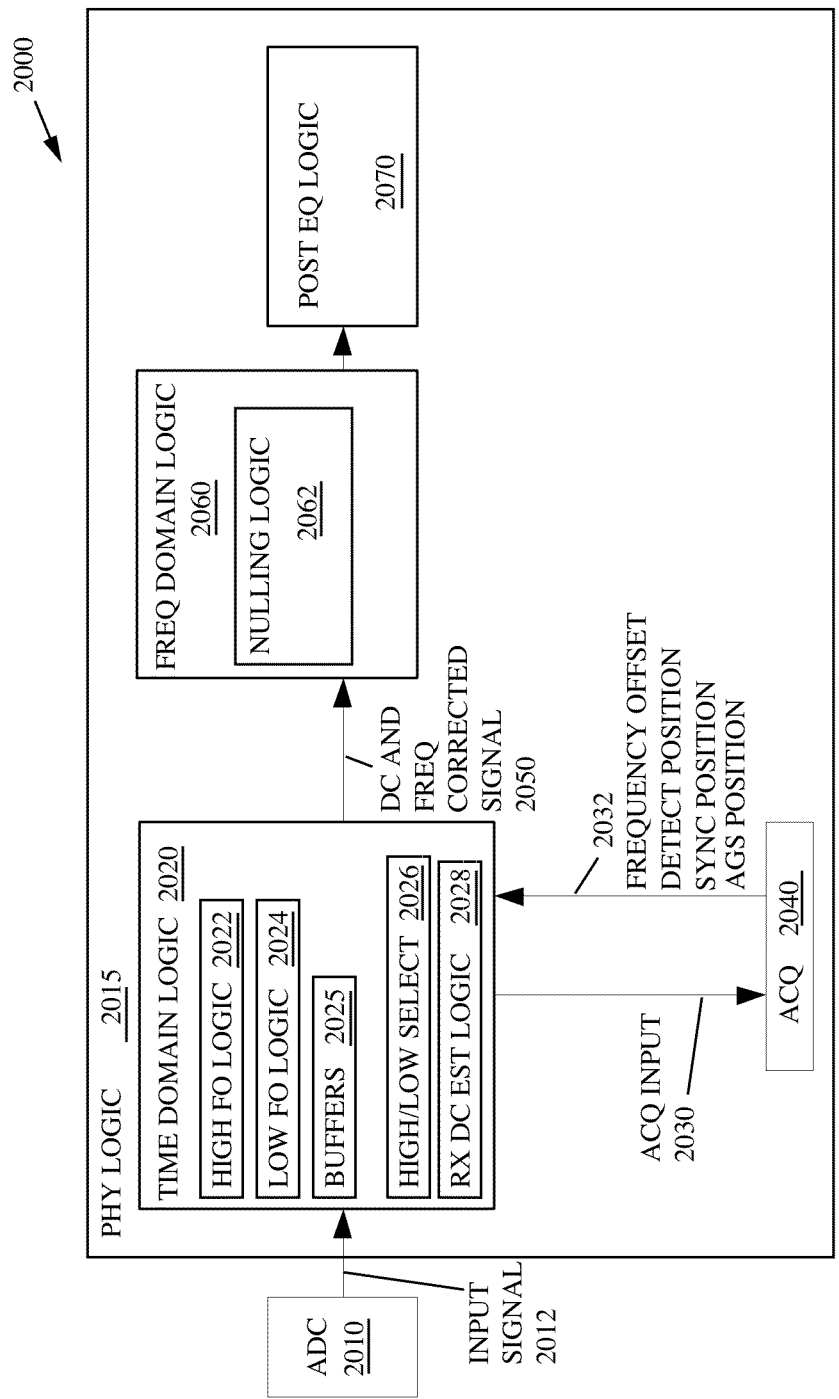
FIG. 2A depicts an embodiment of the PHY logic illustrated in FIG. 1.
Figure 2B:
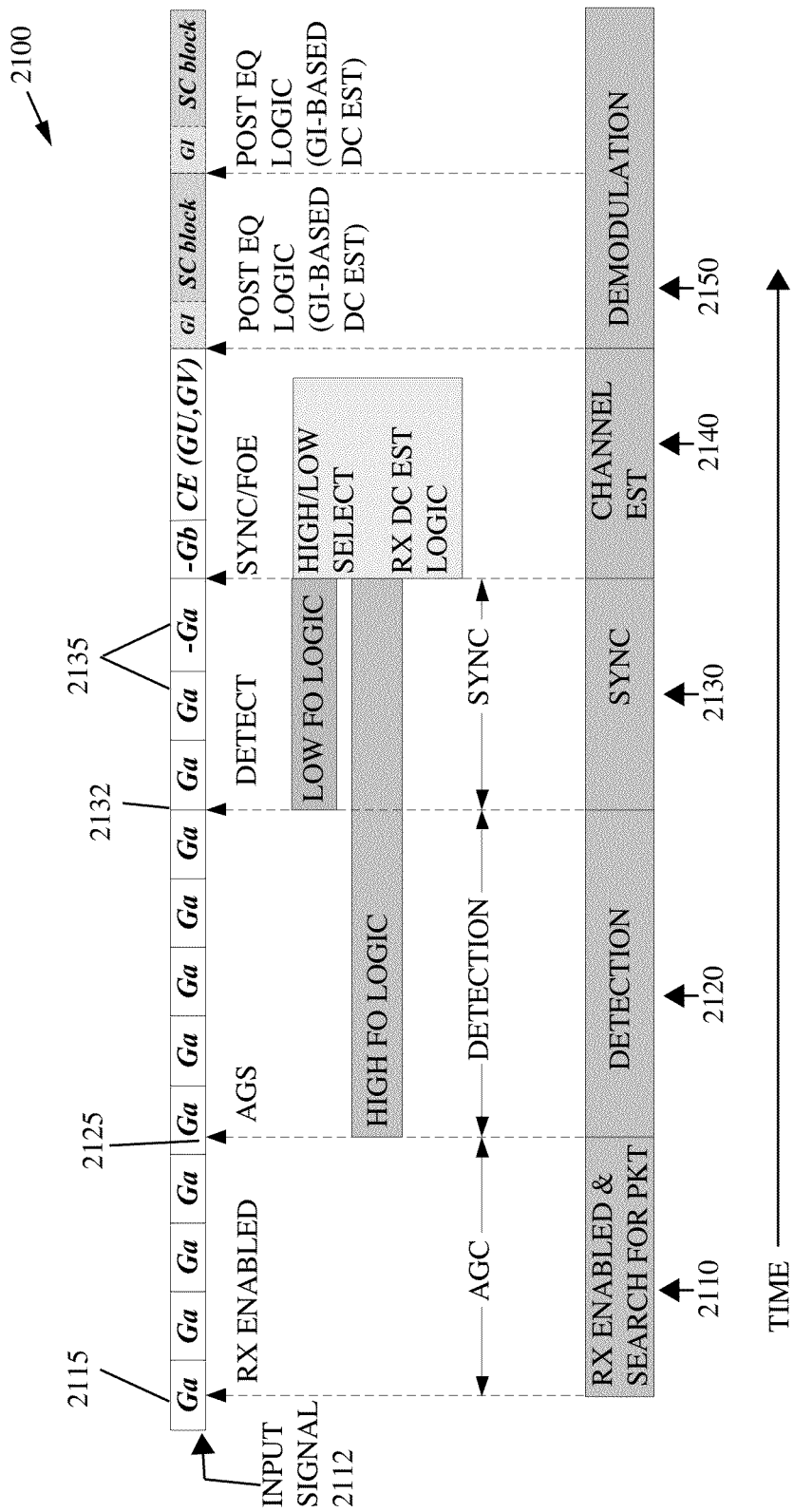
FIG. 2B depicts an embodiment of a timing diagram for DC estimation and mitigation performed by the PHY logic in FIG. 2A.

Referring also to FIG. 2B, there is shown a timeline 2100 that is an example of timeline that may govern the process of Rx DC estimation performed by the time domain logic 2020. Time passes as the timeline 2100 progresses from left to right and the input signal 2112 in FIG. 2B may correspond to the input signal 2012 in FIG. 2A for embodiments in which the PHY logic 2015 in FIG. 2A performs the process according to the timeline 2100 illustrated in FIG. 2B.

The timeline 2100 begins with enabling the Receiver and search for packet phase 2110. During this phase 2110, the time domain logic 2020 is beginning to receive a wireless communications packet from the ADC 2010. The packet comprises a preamble followed by a payload. In FIG. 2B, the input signal 2115 represents the packet and the packet includes a preamble with a short training field (STF), a channel estimation field (CE), and a payload represented by the single carrier (SC) blocks preceded by the guard intervals (GIs). The short training field is illustrated by Golay sequences "Ga" through the single Golay sequence "–Ga". Note that the first Golay sequence in the channel estimation field is designated as "–Gb" and is illustrated separately from the rest of the channel estimation field for the purposes of describing the effects of timing offset in samples, which is discussed in more depth in relation to FIGS. 2D and 2E.

In many embodiments, the ACQ logic 2040 may be configured to detect a plurality of sequences of the preamble of a packet of the input signal 2012, e.g., based on samples received from time domain 2020 as ACQ input 2030. The ACQ logic 2040 may perform automatic gain control (AGC) to select a stable analog gain for the input signal 2112, perform edge detection for the Golay sequences to determine the boundaries of the Golay sequences during a detection phase 2120, detect the sync position in the input signal 2012 during a sync phase 2130, and determine a FOE between the sequences during the sync phase 2130, which identifies the end of the short training sequences and the beginning of the channel estimation phase 2140. Thereafter, the PHY logic 2015 proceeds into the demodulation phase 2150.

During the Rx enabled and search for packet phase 2110, the ACQ logic 2040 may perform automatic gain control and output 2032 to the time domain logic 2020 the analog gain stable (AGS) position 2125 in the preamble of the packet. After the AGS position is identified, the gain is stable and Tx DC and Rx DC impairment are assumed to be constant. Furthermore, since Tx DC and Rx DC impairment are assumed to be constant, the high FO logic 2022 begins estimating mean on Golay blocks and storing the results in the buffers 2025.

During the detection phase 2120, the ACQ logic 2040 may determine the boundaries of the Golay sequences while the high FO logic 2022 averages samples of the Golay sequences. Once the ACQ detects an edge of a Golay sequence 2132, the ACQ logic 3040 and the time domain logic 2020 enter the sync phase 2130.

During the sync phase 2130, the low FO logic 2024 begins determining means for Golay sequences. Note that at this point both the high FO logic 2022 and the low FO logic 2024 are operating concurrently, determining means for Golay sequences and storing the results in buffers 2025. During the sync phase 2130, the ACQ logic 2040 may locate the [Ga, –Ga] 2135 section, denoted as the "sync position", and may estimate FO.

The sync phase 2130 ends and the channel estimation phase 2140 begins in response to the ACQ logic 2040 outputting 2032 the sync position 2135 and the FOE to the time domain logic 2020. Furthermore, the high FO logic 2022 and the low FO logic 2024 stop determining means of the sequences and begin to determine the DC estimations in response to identification of the sync position 2135. In particular, the high FO logic 2022 may determine a high FO Rx DC estimation based upon the means that the high FO logic 2022 stored in the buffers 2025. The low. FO logic 2024 may determine a low FO Rx DC estimation based upon the means that the low FO logic 2022 stored in the buffers 2025 for the last two Golay sequences, Ga and –Ga 2135 in the short training field.

At this point, the time domain logic 2020 may have two sets of Rx DC estimation. The high/low select logic 2026 may select between the high FO Rx DC estimation and the low FO Rx DC estimation based upon the FOE. In many embodiments, if the FOE is greater than a threshold FOE, the high/low select logic 2026 may select the high FO Rx DC estimation. On the other hand, if the FOE is less than or equal to the threshold FOE, the high/low select logic 2026 may select the low FO Rx DC estimation.

In response to selecting the Rx DC estimation, the Rx DC estimation logic 2028 may determine the DC and FO corrected signal 2050 to output to the frequency domain logic 2060 by subtracting the selected Rx DC estimation from the input signal 2012 (or 2112).

The frequency domain logic 2060 may comprise Fourier transform logic such as a Discrete Fourier transform (DFT) module to transform the time domain, DC and FO corrected signal 2050 to the frequency domain. The output of the DFT module includes frequency bins for different frequencies represented in the DC and FO corrected signal 2050. In particular, the frequency bins include a DC bin and, after the DC and FO correction in the time domain logic 2020, the Tx DC may be at DC frequency. In many embodiments, the frequency domain logic 2060 comprises nulling logic 2062 to null the DC bin at the output of the Fourier transform to remove the Tx DC.

Considering that the Rx DC estimation may have some error and the FOE may have some error, the Rx DC and the FO may not be completely removed from the DC and FO corrected signal 2050. Thus, in some embodiments, nulling the DC bin may leave a residual Tx DC and Rx DC impairment. In several embodiments, the residual Tx DC and Rx DC may be estimated and corrected in the post equalization logic 2070.

The post equalization logic 2070 may estimate Tx DC and residual Rx DC by averaging the samples over the GI section and subtracting the theoretical mean of the GI section since the theoretical mean is known. In some embodiments, the post equalization logic 2070 may estimate Tx DC and residual Rx DC with the following equation:

$$\overline{dc}_{GIbased} = \frac{\sum_{k=1}^{64} GI_r[k] - \sum_{k=1}^{64} GI_{th}[k]}{64}$$

where:
$GI_r[k]$—The received GI samples (after equalization).
$GI_{th}[k]$—Known theoretical value of GI sequence.

After estimation, the correction is done by subtracting $\overline{dc}_{GIbased}$ from the equalized data samples.

Figure 2C:
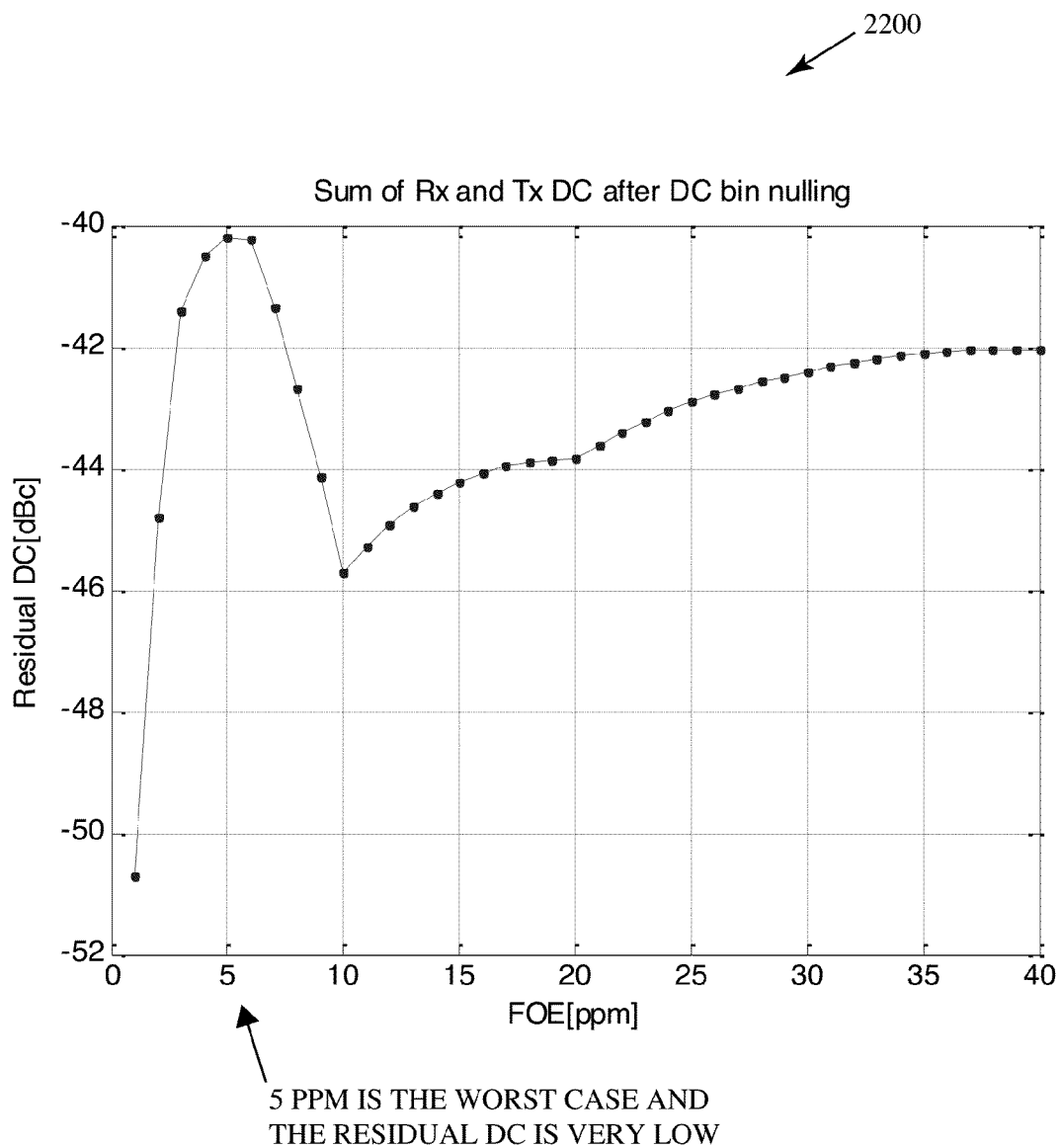
FIG. 2C depicts an embodiment of a simulation of the sum of residual Rx and Tx DC bias in a signal after mitigation of the DC bias by the PHY logic and DC bin nulling in FIG. 2A.

Referring now to FIG. 2C, there is shown an embodiment 2200 of a simulation of the residual receiver and transmitter DC bias in a signal after mitigation of the DC bias by the PHY logic in FIG. 2A. After the DFT, the nulling of the DC bin may remove Tx DC and, in the case of low FO logic 2024, it will also remove most of the residual Rx DC (since the Rx DC is located close to the Tx DC). FIG. 2C shows the sum of residual Rx and Tx DC after DC bin nulling vs. FOE measured in ppm. As can be seen in the graph, at the worst case point (around 5 ppm), the sum of residual Rx DC and Tx DC is very low, i.e., approximately −40 dBc.

An embodiment of the DC estimation and mitigation may be implemented with a mathematical model. The repetitive signal section model is:

$$\tilde{m}_1 = dc_{Rx} + dc_{Tx} + dc_S + \tilde{v}_1$$

$$\tilde{m}_2 = dc_{Rx} + (dc_{Tx} + dc_S)e^{j\theta_1} + \tilde{v}_2$$

Where:
$\tilde{m}_1/\tilde{m}_2$: mean estimations over 2 Golay sequences,
$dc_{Rx}$: Rx DC value that we want to estimate,
$dc_S$: Ga related mean (signal related mean), during the first of the 2 Golay sequences,
$dc_{Tx}$: Tx DC, during the first of the 2 Golay sequences,
and $\tilde{v}_1/\tilde{v}_2$: Noise terms Using the FOE from the ACQ logic 2040, derive the phase difference $\theta_1$ between the segments and compensate this rotation as follows:

$$\overline{dc}_{rx}^{HighFO} = \frac{\tilde{m}_1 - \tilde{m}_2 e^{-j\theta_1}}{1 - e^{-j\theta_1}} =$$

$$\frac{e^{-j\frac{\theta_1}{2}}\left(\tilde{m}_1 e^{+j\frac{\theta_1}{2}} - \tilde{m}_2 e^{-j\frac{\theta_1}{2}}\right)}{e^{-j\frac{\theta_1}{2}}\left(e^{+j\frac{\theta_1}{2}} - e^{-j\frac{\theta_1}{2}}\right)} = \frac{1}{2} \cdot \left[(\tilde{m}_1 + \tilde{m}_2) + j(\tilde{m}_1 - \tilde{m}_2)\cot\left(\frac{\theta_1}{2}\right)\right]$$

Note that due to $$\cot\left(\frac{\theta_1}{2}\right)$$

component, the expression goes to infinity for low $\theta_1$. Therefore, for low FO, use low FO logic 2024 by locating the zero mean section, i.e., the [Ga,−Ga] section. The model for this section of the signal may be:

$$m_1 = dc_{Rx} + (dc_{Tx} + dc_S) + v_1$$

$$m_2 = dc_{Rx} + (dc_{Tx} - dc_S)e^{j\theta_2} + v_2$$

Where:
$dc_{Rx}$: Rx DC value that we want to estimate,
$dc_S$: Ga related mean (signal related mean), during the first of the 2 Golay sequences
$dc_{Tx}$: Tx DC, during the first of the 2 Golay sequences and
$v_1/v_2$: Noise terms Using FOE from the ACQ logic 2040, derive the phase difference $\theta_2$ and compensate for this rotation as follows:

$$\overline{dc}_{rx}^{LowFO} = \frac{1}{2} \cdot \left[(m_1 + m_2) + j(m_1 - m_2)\tan\left(\frac{\theta_2}{2}\right)\right] = dc + \frac{2}{1 + e^{-j\theta_2}}dc_{Tx}$$

Note that this cancels the signal related DC but does not mitigate Tx DC. After the DFT, null the DC bin. This may remove Tx DC and, in the case of low FO logic 2024, this may also remove most of the residual Rx DC.

Thus, if the threshold for the FOE is 5 ppm, an embodiment of the DC estimation and mitigation process performed by the PHY logic 2015 may include:

Estimate $(\tilde{m}_1, \tilde{m}_2)$ and $(m_1, m_2)$.
Estimate phase difference $\theta_1$ and $\theta_2$ using ACQ FOE.
If |FOE|>5 [ppm]

$$\overline{dc}_{rx}^{HighFO} = \frac{1}{2} \cdot \left[(\tilde{m}_1 + \tilde{m}_2) + j(\tilde{m}_1 - \tilde{m}_2)\cot\left(\frac{\theta_1}{2}\right)\right]$$

else $$\overline{dc}_{rx}^{LowFO} = \frac{1}{2} \cdot \left[(\tilde{m}_1 + \tilde{m}_2) + j(\tilde{m}_1 - \tilde{m}_2)\tan\left(\frac{\theta_2}{2}\right)\right]$$

Remove Rx DC.
For each DFT block:
a. Null the DC bin in the frequency domain (FD).
b. Post equalization GI-based Tx and residual Rx DC estimation and correction:

$$\overline{dc}_{GIbased} = \frac{\sum_{k=1}^{64} GI_r[k] - \sum_{k=1}^{64} GI_{th}[k]}{64}$$

Figure 2D:
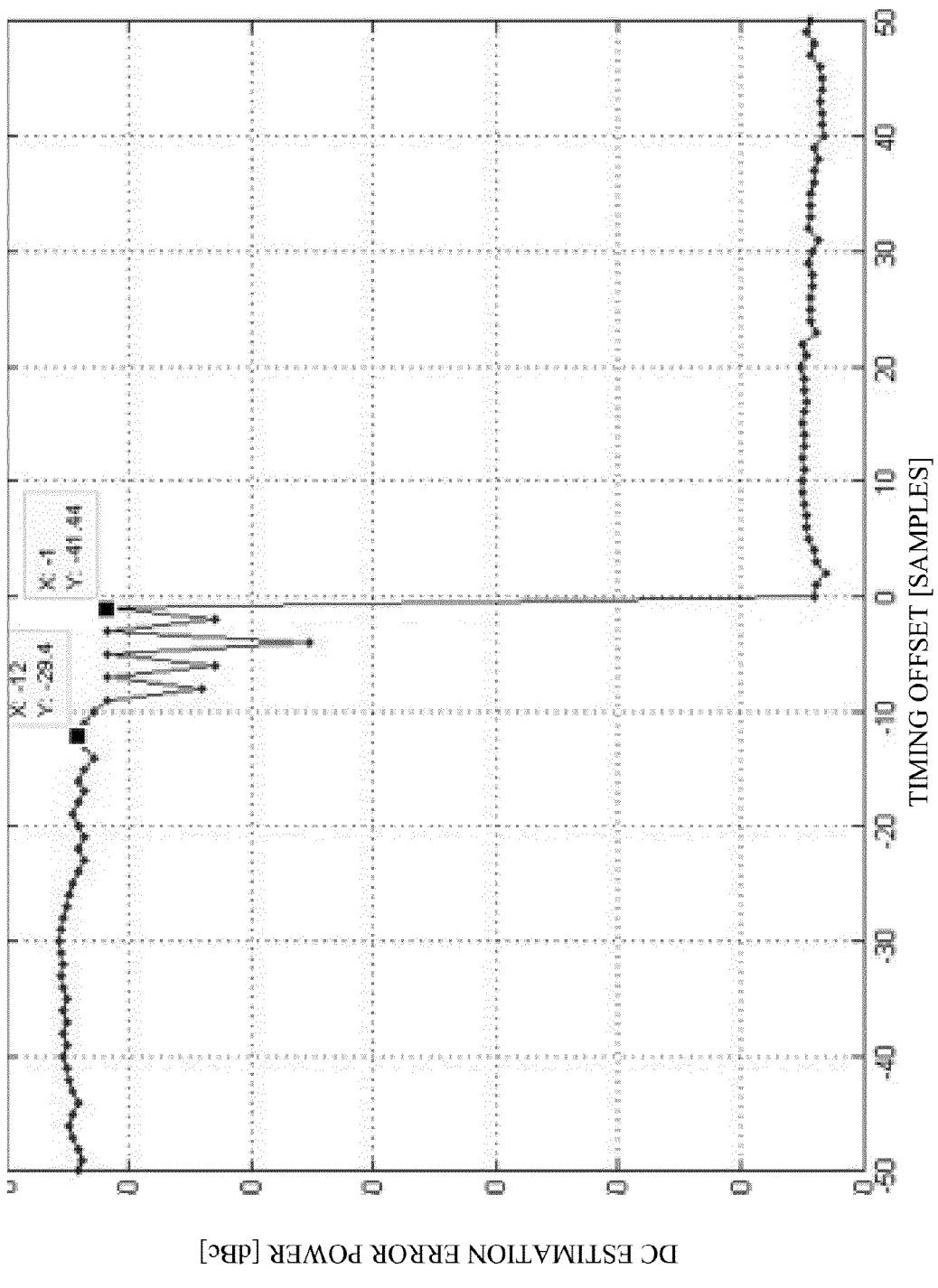
FIG. 2D depicts an embodiment of the error in receiver DC estimation as a function of timing offset of samples of the signal.
Figure 2E:
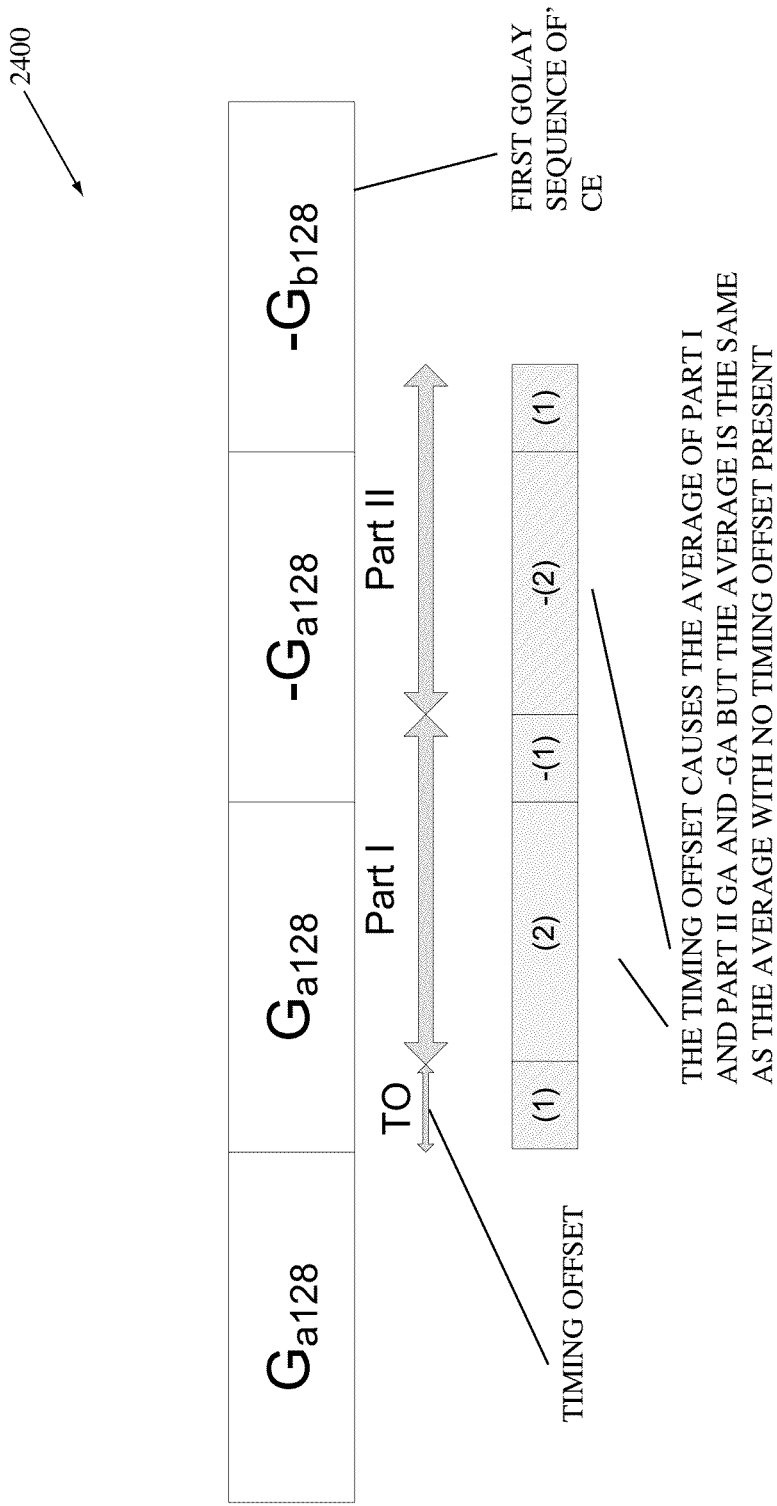
FIG. 2E depicts an embodiment of a low frequency offset Golay sequence of a short training sequence in a preamble of a packet to sample for receiver DC estimation along with examples of values of the Golay sequences associated with and without a timing offset in the sampling.

Referring now to FIGS. 2D and 2E, FIG. 2D illustrates an embodiment of the error in receiver DC estimation as a function of timing offset of samples of the signal and FIG. 2E illustrates an embodiment of a low frequency offset Golay sequence of a short training sequence in a preamble of a packet to sample for Rx DC estimation along with examples of values of the Golay sequences associated with and without a timing offset in the sampling.

In the low FO logic 2024, under timing offset errors, the zero mean assumption may not be valid. The error is a function of the sequences around [Ga, −Ga] 2135 section and the magnitude of the frequency offset. The graph 2300 shows the effect of the timing offset on the DC estimation error under infinite signal-to-noise ratio (SNR), Additive White Gaussian Noise (AWGN) channel model, FO=40 ppm and no phase noise.

As seen in the graph 2300, positive timing offsets do not increase low FO logic 2024 DC estimation error. However, negative timing offsets can be significant. The reason for this effect relates to the first half of the −Gb sequence (first Golay sequence of the CE). The first half of the −Gb sequence equals the first half of Ga. In other words, if the timing offset (TO) is as illustrated in FIG. 2E, the mean of the values of Part I and Part II cancel each other.

Because positive timing offset (up to 64 samples) has no effect on the results, a deliberate offset of 30 samples (similar to guard interval used in OFDM) can be added so that the calculations may tolerate up to [−30, 33] samples of timing offset uncertainty.

With regard to the high FO logic 2022, because the logic uses the repetitive signal structure and not necessarily values within boundaries of particular Golay sequences [Ga, Ga, . . . , Ga], the means determinations do not have to be aligned with the Golay sequence edges so the calculations are not effected by timing offset errors.

Referring again to FIG. 1, the network 1005 may represent an interconnection of a number of networks. For instance, the network 1005 may couple with a wide area network such as the Internet or an intranet and may interconnect local devices wired or wirelessly interconnected via one or more hubs, routers, or switches. In the present embodiment, the network 1005 communicatively couples communications devices 1010, 1030, 1050, and 1055.

The communication devices 1010 and 1030 comprise processor(s) 1001 and 1002, memory 1011 and 1031, and MAC sublayer logic 1018 and 1038, respectively. The processor(s) 1001 and 1002 may comprise any data processing device such as a microprocessor, a microcontroller, a state machine, and/or the like, and may execute instructions or code in the memory 1011 and 1031. The memory 1011 and 1031 may comprise a storage medium such as Dynamic Random Access Memory (DRAM), read only memory (ROM), buffers, registers, cache, flash memory, hard disk drives, solid-state drives, or the like. The memory 1011 and 1031 may be coupled with the MAC sublayer logic 1018 and 1038, respectively, and/or may be coupled with the PHY devices, transceivers 1020 and 1040, respectively. In many embodiments, the memory 1011 and 1031 may comprise memory 1012 and 1032, respectively. The memory 1012 and 1032 may be allocated to store the frames and/or the frame structures, as well as frame headers or portions thereof. In many embodiments, the frames may comprise fields based upon the structure of the standard frame structures identified in IEEE 802.11.

The MAC sublayer logic 1018 and 1038 may comprise logic to implement functionality of the MAC sublayer of the data link layer of the communications devices 1010 and 1030, respectively. The MAC sublayer logic 1018 and 1038 may generate the frames such as management frames, data frames, and control frames, and may communicate with the PHY logic 1029 and 1039, respectively. The PHY logic 1029 and 1039 may generate physical layer protocol data units (PPDUs) based upon the frames. More specifically, the frame builders may generate frames and the data unit builders of the PHY logic 1029 and 1039 may prepend the frames with preambles to generate PPDUs for transmission via a physical layer (PHY) device such as the transceivers (RX/TX) 1020 and 1040, respectively.

The MAC frame, also referred to as MAC layer Service Data Units (MSDUs), may comprise, e.g., a management frame. For example, a frame builder may generate a management frame such as the beacon frame to identify the communications device 1010 as having capabilities such as supported data rates, power saving features, cross-support, and a service set identification (SSID) of the network to identify the network to the communications device 1030. The MAC sublayer logic 1018 may pass the frame to the PHY logic 1029 and the PHY logic 1029 may prepend a preamble to generate a PHY frame prior to transmitting the PHY frame. The PHY frame is also referred to as a PPDU.

The communications devices 1010, 1030, 1050, and 1055 may each comprise a transmitters and receivers such as transceivers (RX/TX) 1020 and 1040. In many embodiments, transceivers 1020 and 1040 may implement four different PHY layers: Control PHY, SC (single carrier) PHY, OFDM PHY and low-power SC PHY (LPSC PHY). Control PHY is modulation and coding scheme 0 (MCS0). SC starts at MCS1 and ends at MCS12; OFDM PHY starts at MCS13 and ends at MCS24; and LPSC starts at MCS25 and ends at MCS31. MCS0 to MCS4 may be mandatory PHY MCSs.

Note that this is just illustrative of the schemes that may be included in many embodiments but embodiments are not so limited. For example, other embodiments may only have one or more MCS's of the Control PHY and SC PHY or one or more MCS's of the Control PHY, SC PHY, and OFDM.

The PHY logic 1029 and 1039 may implement a method of encoding digital data on multiple carrier frequencies. The PHY logic 1029 and 1039 may comprise a frequency-division multiplexing scheme used as a digital multi-carrier modulation method. Data may be carried in a large number of closely spaced orthogonal subcarrier signals. The data may be divided into several parallel data streams or channels, one for each subcarrier. Each subcarrier may be modulated with a modulation scheme at a low symbol rate, maintaining total data rates similar to conventional single-carrier modulation schemes in the same bandwidth.

An OFDM system uses several carriers, or "tones," for functions including data, pilot, guard, and nulling. Data tones are used to transfer information between the transmitter and receiver via one of the channels. Pilot tones are used to maintain the channels, and may provide information about time/frequency and channel tracking. And guard tones may help the signal conform to a spectral mask.

Guard intervals may be inserted between symbols such as between every OFDM symbol as well as between the short training field (STF) and long training field (LTF) symbols in the front end of the transmitter during transmission to avoid inter-symbol interference (ISI). ISI might result from multipath distortion.

Each transceiver 1020 and 1040 comprises a radio 1025 and 1045, respectively, comprising an RF transmitter and an RF receiver. The PHY logic 1029 and 1039 may transform information signals into signals to be applied via the radios 1025 and 1045 to elements of an antenna(s) 1024 and 1044, respectively. An RF receiver receives electromagnetic energy at an RF frequency via elements of an antenna(s) 1024 and 1044 and radios 1025 and 1045, respectively. The PHY logic 1029 and 1039 may extract the digital data from the symbols received via the radios 1025 and 1045, respectively.

In some embodiments, the communications device 1010 comprises a Beam Former (BF) 1023. The BF 1023 may comprise a device that performs digital beam forming such as a Digital Beam Former (DBF) or any other process for beam forming. The BF 1023 may process to signals to create directional transmissions based upon constructive and destructive interferences between the waveforms to be applied to elements of antenna(s) 1024. The antenna(s) 1024 may be an array of individual, separately excitable antenna elements. The signals applied to the elements of the antenna(s) 1024 cause the antenna(s) 1024 to radiate one to four spatial channels. Each spatial channel so formed may carry information to one or more of the communications devices 1030, 1050, and 1055.

Similarly, the communications device 1030 comprises the transceiver (RX/TX) 1040 to receive and transmit signals from and to the communications device 1010. The transceiver (RX/TX) 1040 may comprise an antenna(s) 1044 and, optionally, a BF 1043. The elements of the antenna(s) 1044 may receive signals in, e.g., one to four spatial channels and the BF 1043 may be trained to received directional signals from a transmitter.

FIG. 1 may depict a number of different embodiments including a Multiple-Input, Multiple-Output (MIMO) system with, e.g., four spatial streams, and may depict degenerate systems in which one or more of the communications devices 1010, 1030, 1050, and 1055 comprise a receiver and/or a transmitter with a single antenna including a Single-Input, Single Output (SISO) system, a Single-Input, Multiple Output (SIMO) system, and a Multiple-Input, Single Output (MISO) system. In the alternative, FIG. 1 may depict transceivers that include multiple antennas and that may be capable of multiple-user MIMO (MU-MIMO) operation.

Figure 3:
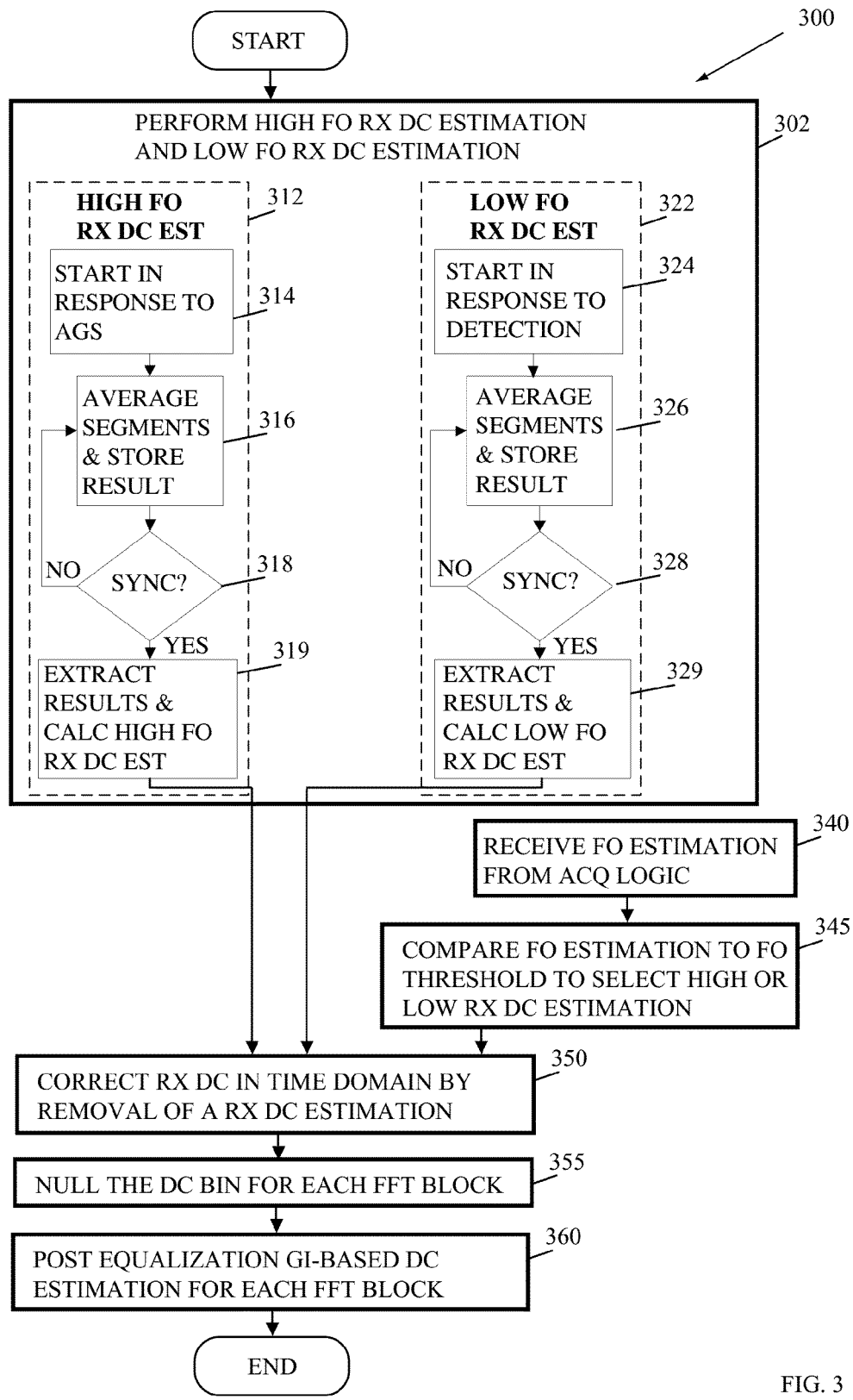
FIG. 3 depicts an embodiment of a flowchart to estimate and mitigate DC bias in a packet such as is illustrated in FIGS. 1-2.

FIG. 3 depicts an embodiment of a flowchart 300 to estimate and mitigate DC bias in a packet such as is illustrated in FIGS. 1-2. The flowchart 300 begins with PHY logic, such as the PHY logic 1039 in FIG. 1 or the PHY logic 2015 in FIG. 2A receiving a packet from an analog-to-digital converter. The PHY logic may perform high frequency offset (FO) receiver (Rx) DC estimation (element 302). In the present embodiment, the PHY logic may account for two different scenarios. In the first scenario, the packet may be received with a high FO and, in the second scenario, the packet may be received with a low FO.

To handle both of these scenarios, the PHY logic may implement two processes for determining the Rx DC estimations including a high FO Rx DC estimation 312 and a low FO Rx DC estimation 322 that may operate concurrently. In other words, the high FO Rx DC estimation 312 process and a low FO Rx DC estimation 322 process may perform operations simultaneously but may not start at the same time. The high FO Rx DC estimation 312 process may perform a process such as the process of the high FO Rx DC estimation logic 2022 in FIG. 2A and may start in response to an indication of a stable gain on the input signal (element 314). Thereafter, the high FO Rx DC estimation 312 process may average segments of Golay sequences and store the result in a buffer (element 316).

Until the PHY logic receives an indication of the sync position, the high FO Rx DC estimation 312 process may continue to average segments of Golay sequences and store the result in a buffer (element 316). In response to receiving an indication of the sync position (element 318), the high FO Rx DC estimation 312 process may extract the results from the buffer and calculate the high FO Rx DC estimation (element 319).

The low FO Rx DC estimation 322 process may start averaging the Golay sequences in response to detection of an edge of a Golay sequence (element 324). The low FO Rx DC estimation 322 process may continue to average segments of the Golay sequences and store the results in a buffer (element 326) until the PHY logic receives an indication of a sync position (element 328). In response to receiving an indication of the sync position, the low FO Rx DC estimation 322 process may extract the results from the buffer and calculate the low FO Rx DC estimation (element 329).

On or about the same time that the PHY logic receives an indication of the sync position (element 328), the PHY logic may receive an indication of a frequency-offset estimation (FOE) from, e.g., ACQ logic (element 340) such as the ACQ logic 2040 in FIG. 2A. The PHY logic may compare the FOE to an FO threshold to select the high FO or low FO Rx DC estimation (element 345).

In response to selecting either the high FO or low FO Rx DC estimation, the PHY logic may correct the packet in the signal by removing the Rx DC estimation and correcting the signal for the FOE (element 350). The correction of the Rx DC and the FO in the signal may place the Tx DC at the DC frequency so nulling the DC frequency bin resulting from a fast Fourier transform (FFT) may mitigate the Tx DC in the signal (element 355). Thereafter, the residual Tx DC and Rx DC may be estimated and corrected with a guard interval-based DC estimation after equalization of the signal (element 360).

The following examples pertain to further embodiments. One example comprises an apparatus for DC estimation of a wireless communication packet. The apparatus may comprise high frequency offset logic to determine a first DC estimation based upon a first set of sequences in a preamble of the wireless communication packet; low frequency offset logic to determine a second DC estimation based upon a second set of sequences in the preamble; selection logic to select one of the DC estimations based upon a frequency offset estimation; and receiver DC estimation logic to remove the one of the DC estimations from the packet.

In some embodiments, the apparatus may further comprise a processor, a memory coupled with the processor, a radio coupled with the physical layer logic, and one or more antennas coupled with the radio to receive the response. In some embodiments, the apparatus may further comprise nulling logic to null DC bins that result from a Fourier transform of the packet to mitigate transmitter DC bias. In some embodiments, the apparatus may further comprise post equalization logic to determine a correction for the packet based upon a difference between a predetermined guard interval value and a received guard interval value and to apply the correction to the packet. In some embodiments, the first set of sequences comprises a set of short training sequences received after ACQ logic indicates that an analog gain for the sequences is stable. In some embodiments, the second set of sequences comprises a set of short training sequences received after ACQ logic detects a boundary of the sequences. In some embodiments, the second set of sequences comprises a Golay sequence Ga and a Golay sequence −Ga.

Another embodiment comprises one or more tangible computer-readable non-transitory storage media comprising computer-executable instructions operable to, when executed by at least one computer processor, to implement a method comprising determining a first DC estimation of a receiver based upon a first set of sequences in a preamble of a wireless communication packet; determining a second DC estimation of the receiver based upon a second set of sequences in the preamble; selecting one of the DC estimations based upon a frequency offset estimation; and removing the one of the DC estimations from the packet.

In some embodiments, the storage media may further comprise null DC bins that result from a Fourier transform of the packet to mitigate transmitter DC bias. In some embodiments, the storage media may further comprise determining a correction for the packet based upon a difference between a predetermined guard interval value and a received guard interval value and applying the correction to the packet. In some embodiments, the first set of sequences comprises a set of short training sequences received after ACQ logic indicates that an analog gain for the sequences is stable. In some embodiments, the second set of sequences comprises a set of short training sequences received after ACQ logic detects a boundary of the sequences. In some embodiments, the second set of sequences comprises a Golay sequence Ga and a Golay sequence −Ga.

Another embodiment may comprise a method for DC estimation of a wireless communication packet. The method may comprise determining a first DC estimation of a receiver based upon a first set of sequences in a preamble of a wireless communication packet; determining a second DC estimation of the receiver based upon a second set of sequences in the preamble; selecting one of the DC estimations based upon a frequency offset estimation; and removing the one of the DC estimations from the packet.

In some embodiments, the method may further comprise nulling DC bins that result from a Fourier transform of the packet to mitigate transmitter DC bias. In some embodiments, the method may further comprise determining a correction for the packet based upon a difference between a predetermined guard interval value and a received guard interval value and applying the correction to the packet. In some embodiments, the first set of sequences comprises a set of short training sequences received after ACQ logic indicates that an analog gain for the sequences is stable. In some embodiments, the second set of sequences comprises a set of short training sequences received after ACQ logic detects a boundary of the sequences. In some embodiments, the second set of sequences comprises a Golay sequence Ga and a Golay sequence –Ga.

In a further embodiment, a system may comprise a processor; a memory coupled with the processor; a physical layer (PHY) logic coupled with the memory to determine a first DC estimation of a receiver based upon a first set of sequences in a preamble of the wireless communication packet; to determine a second DC estimation of the receiver based upon a second set of sequences in the preamble; to select one of the DC estimations based upon a frequency offset estimation; and to remove the one of the DC estimations from the packet; and one or more antennas coupled with the radio to receive the packet.

In some embodiments, the PHY logic comprises nulling logic to null DC bins that result from a Fourier transform of the packet to mitigate transmitter DC bias. In some embodiments, the PHY logic comprises post equalization logic to determine a correction for the packet based upon a difference between a predetermined guard interval value and a received guard interval value and to apply the correction to the packet. In some embodiments, the apparatus may further comprise post equalization logic to determine a correction for the packet based upon a difference between a predetermined guard interval value and a received guard interval value and to apply the correction to the packet. In some embodiments, the first set of sequences comprises a set of short training sequences received after ACQ logic indicates that an analog gain for the sequences is stable. In some embodiments, the second set of sequences comprises a set of short training sequences received after ACQ logic detects a boundary of the sequences. In some embodiments, the second set of sequences comprises a Golay sequence Ga and a Golay sequence –Ga.

Another embodiment may comprise an apparatus for DC estimation of a wireless communication packet. The apparatus may comprise a means for determining a first DC estimation of a receiver based upon a first set of sequences in a preamble of a wireless communication packet; a means for determining a second DC estimation of the receiver based upon a second set of sequences in the preamble; a means for selecting one of the DC estimations based upon a frequency offset estimation; and a means for removing the one of the DC estimations from the packet.

In some embodiments, the apparatus may further comprise a means for nulling DC bins that result from a Fourier transform of the packet to mitigate transmitter DC bias. In some embodiments, the apparatus may further comprise a means for determining a correction for the packet based upon a difference between a predetermined guard interval value and a received guard interval value and applying the correction to the packet. In some embodiments, the first set of sequences comprises a set of short training sequences received after ACQ logic indicates that an analog gain for the sequences is stable. In some embodiments, the second set of sequences comprises a set of short training sequences received after ACQ logic detects a boundary of the sequences. In some embodiments, the second set of sequences comprises a Golay sequence Ga and a Golay sequence –Ga.

In some embodiments, some or all of the features described above and in the claims may be implemented in one embodiment. For instance, alternative features may be implemented as alternatives in an embodiment along with logic or selectable preference to determine which alternative to implement. Some embodiments with features that are not mutually exclusive may also include logic or a selectable preference to activate or deactivate one or more of the features. For instance, some features may be selected at the time of manufacture by including or removing a circuit pathway or transistor. Further features may be selected at the time of deployment or after deployment via logic or a selectable preference such as a dipswitch or the like. A user after via a selectable preference such as a software preference, an e-fuse, or the like may select still further features.

Another embodiment is implemented as one or more tangible computer-readable non-transitory storage media comprising computer-executable instructions operable to, when executed by at least one computer processor, enable the at least one computer processor to implement systems and methods described with reference to FIGS. 1-3. Some embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

What is claimed is:

1. An apparatus for direct current (DC) estimation of a wireless communication packet, the apparatus comprising:
   high frequency offset logic to determine a first DC estimation based upon a first set of sequences in a preamble of the wireless communication packet;
   low frequency offset logic to determine a second DC estimation based upon a second set of sequences in the preamble, the low frequency offset logic to start to determine the second DC estimation after the acquisition (ACQ) logic detects a boundary of the second set of sequences;
   selection logic to select one of the DC estimations based upon a frequency offset estimation; and
   receiver DC estimation logic to remove the one of the DC estimations from the wireless communication packet.

2. The apparatus of claim 1, further comprising a processor, a memory coupled with the processor, a radio coupled with physical layer logic, and one or more antennas coupled with the radio.

3. The apparatus of claim 1, further comprising nulling logic to null DC bins that result from a Fourier transform of the packet to mitigate transmitter DC bias.

4. The apparatus of claim 1, further comprising post equalization logic to determine a correction for the packet based upon a difference between a predetermined guard interval value and a received guard interval value and to apply the correction to the packet.

5. The apparatus of claim 1, wherein the first set of sequences comprises a set of short training sequences received after the ACQ logic indicates that an analog gain for the first set of sequences is stable.

6. The apparatus of claim 1, wherein the second set of sequences comprises a set of short training sequences received after the ACQ logic detects a boundary of the second set of sequences.

7. The apparatus of claim 1, wherein the second set of sequences comprises a Golay sequence Ga and a Golay sequence –Ga.

8. One or more tangible computer-readable non-transitory storage media comprising computer-executable instructions operable to, when executed by at least one computer processor, enable the at least one computer processor to implement a method comprising:
   determining a first direct current (DC) estimation based upon a first set of sequences in a preamble of a wireless communication packet;
   determining a second DC estimation based upon a second set of sequences in the preamble, wherein the determining the second DC estimation comprises starting to determine the second DC estimation after the acquisition (ACQ) logic detects a boundary of the second set of sequences;
   selecting one of the DC estimations based upon a frequency offset estimation; and
   removing the one of the DC estimations from the wireless communication packet.

9. The storage media of claim 8, wherein the method further comprises null DC bins that result from a Fourier transform of the packet to mitigate transmitter DC bias.

10. The storage media of claim 8, wherein the method further comprises determining a correction for the packet based upon a difference between a predetermined guard interval value and a received guard interval value and applying the correction to the packet.

11. The storage media of claim 8, wherein the first set of sequences comprises a set of short training sequences received after the ACQ logic indicates that an analog gain for the first set of sequences is stable.

12. The storage media of claim 8, wherein the second set of sequences comprises a set of short training sequences received after the ACQ logic detects a boundary of the second set of sequences.

13. The storage media of claim 8, wherein the second set of sequences comprises a Golay sequence Ga and a Golay sequence –Ga.

14. A method for direct current (DC) estimation of a wireless communication packet, the method comprising:
   determining a first DC estimation based upon a first set of sequences in a preamble of the wireless communication packet;
   determining a second DC estimation based upon a second set of sequences in the preamble, wherein the determining the second DC estimation comprises starting to determine the second DC estimation after the acquisition (ACQ) logic detects a boundary of the second set of sequences;
   selecting one of the DC estimations based upon a frequency offset estimation; and
   removing the one of the DC estimations from the wireless communication packet.

15. The method of claim 14, further comprising nulling DC bins that result from a Fourier transform of the packet to mitigate transmitter DC bias.

16. The method of claim 14, further comprising determining a correction for the packet based upon a difference between a predetermined guard interval value and a received guard interval value and applying the correction to the packet.

17. The method of claim 14, wherein the first set of sequences comprises a set of short training sequences received after the ACQ logic indicates that an analog gain for the first set of sequences is stable.

18. The method of claim 14, wherein the second set of sequences comprises a set of short training sequences received after the ACQ logic detects a boundary of the second set of sequences.

19. The method of claim 14, wherein the second set of sequences comprises a Golay sequence Ga and a Golay sequence –Ga.

20. A system for direct current (DC) estimation of a wireless communication packet, the system comprising:
- a processor;
- a memory coupled with the processor;
- a physical layer (PHY) logic to determine a first DC estimation based upon a first set of sequences in a preamble of the wireless communication packet; to determine a second DC estimation based upon a second set of sequences in the preamble, the PHY logic to start to determine the second DC estimation after acquisition (ACQ) logic detects a boundary of the second set of sequences; to select one of the DC estimations based upon a frequency offset estimation; and to remove the one of the DC estimations from the wireless communication packet;
- a radio; and
- one or more antennas coupled with the radio to receive the wireless communication packet.

21. The apparatus of claim 20, wherein the PHY logic comprises nulling logic to null DC bins that result from a Fourier transform of the wireless communication packet to mitigate transmitter DC bias.

22. The apparatus of claim 20, wherein the PHY logic comprises post equalization logic to determine a correction for the wireless communication packet based upon a difference between a predetermined guard interval value and a received guard interval value and to apply the correction to the packet.

23. The apparatus of claim 20, wherein the first set of sequences comprises a set of short training sequences received after the ACQ logic indicates that an analog gain for the first set of sequences is stable.

24. The apparatus of claim 20, wherein the second set of sequences comprises a set of short training sequences received after the ACQ logic detects a boundary of the second set of sequences.

25. The apparatus of claim 20, wherein the second set of sequences comprises a Golay sequence Ga and a Golay sequence –Ga.

* * * * *